3,090,694
LIQUID ADHESIVE COMPOSITIONS
Louis Pereny, Eric G. Gibbs, and Charles O. Pyron, Dayton, Ohio, assignors to Protective Treatments, Inc., Dayton, Ohio, a corporation of Ohio
No Drawing. Filed Aug. 22, 1958, Ser. No. 756,512
13 Claims. (Cl. 106—177)

This invention relates to liquid adhesive compositions and, more particularly, to such compositions which may be applied in solution form at the point and time of use and which will, even after solvent evaporation, maintain a pressure sensitive adhesiveness of limited tackiness for the repeated adhering and removal of an article at the area or surface to which the adhesive was applied and without removal of the adhesive composition from the area or surface to which first applied.

According to this invention adhesive compositions are provided adapted for application in liquid solution form to a variety of surfaces to form an adhesive or tacky film thereon, which film, even after solvent elimination therefrom, remains usefully tacky for a prolonged period, but such tackiness is maintained at a relatively low level for the repeated adhering and removing of another article or surface. The advantages of adhesive compositions according to this invention are achieved generally by formulating the compositions with a plurality of distinct components for accomplishing the film forming, adhesion producing, plasticizing, solvent evaporation, etc., properties or characteristics of the finished composition. These various components are proportioned, correlated, and combined to provide in the adhesive film not only the desired controlled, limited but prolonged tackiness but also to provide for having the cohesive or film tensile strength and the adhesiveness of the formulation as applied to the first surface to which applied from liquid form substantially exceed the pressure sensitive tackiness of the film after solvent removal so that, not only will the adhesive film preferentially adhere to the surface to which it is first applied, but also repeated removal of another surface applied to the adhesive film will neither disrupt the adhesive film nor remove therefrom adhesive clinging to the article or surface being removed.

As illustrative of applications or uses to which adhesive compositions according to this invention are particularly adapted may be noted the situation where the adhesive composition is applied in liquid form to the skin of a patient about to undergo surgery and then a sterile surgical drape of paper or plastic is positioned and adhered, and possibly repositioned and readhered, to cover the skin of the patient and form a sterile field in the area to be operated on, as disclosed in the copending application of Louis Pereny et al., Serial No. 756,670, now abandoned, executed and filed on even dates herewith; and other illustrative applications may be noted as including resealable wrappers, containers, envelopes, and the like.

One object of this invention is to provide liquid adhesive compositions of the character described for application at the point and time of use to a surface to form thereover an adhesive film having a prolonged but limited tackiness such that another article or surface may be adhered and readhered to the applied adhesive film without disruption thereof.

Another object of this invention is to provide adhesive compositions of the character described adapted to sprayable liquid application to a surface to provide thereover an adhesive film of prolonged tackiness and including distinct plasticizer, film forming, and adhesion producing components formulated and proportioned to give preferential adhesion of the adhesive film to the surface to which it is first applied in liquid form, cohesive or film tensile strength substantially and controllably sufficient to withstand disruption by removal of a pressure applied material, and a limited prolonged tackiness, all whereby another article or surface, after having once been adhered by pressure to the adhesive film, may be removed therefrom cleanly and without either disruption of the adhesive film or carrying away on the article being removed part of the adhesive composition.

A further object of this invention is to provide a sterile liquid adhesive composition of the character described particularly adapted for the sprayable application to human skin prior to a surgical operation so that an area of prolonged tackiness is produced on the skin to receive and hold a sterile drape or sheet, and including components so formulated and proportioned in the adhesive film to provide for firm adherence of the drape or sheet and yet to maintain the adhesive film on the skin notwithstanding repeated adhering and removal of the drape or sheet cleanly from the skin without disruption of either the film on the skin or the drape or sheet, whether the latter be paper, fabric, or plastic.

Other objects and advantages of this invention will be apparent from the following description and the appended claims.

The particular advantages and functioning of compositions embodying this invention can, perhaps, be conveniently considered with regard to the requirements and difficulties and practicing of the surgical technique disclosed in said aforementioned copending application as illustrative of one situation to which compositions embodying this invention are particularly adapted. As there disclosed, it is desired to provide a disposable sterile sheeting or drape which can be adhesively attached to the skin of a surgical patient to provide the surgeon with a large sterile field adjacent the point of the operation, with the adherence of the drape to the patient being continuous without air bubbles, etc., and being such as to encapsulate or immobilize contaminating bacteria which may remain on the skin of the patient notwithstanding antiseptic preoperative procedures. In the application of the drape or sheet, it may have to be applied and removed and positioned and repositioned several times before a final satisfactory result is achieved with regard to smoothing it out, having it conform to the contours of the patient's body, etc.

Since the drape or sheeting itself must be heat sterilized and since a drape or sheeting as large as, perhaps, four or five feet square may be utilized and applied without contamination in the sterile operating room, the difficulties inherent in attempting to provide a pressure sensitive adhesive to the back of the sheet or drape itself are apparent. Similarly, an adhesive composition applied to the patent's skin at the point and time of use advantageously includes characteristics of remaining tacky for at least the period necessary to correctly position and reposition the drape on the patient and, additionally, should have such correlation of cohesive and adhesive strength as to be preferentially adhesive to the patient's skin and not to strip off the patient's skin with removal of the drape in repositioning thereof, and yet have such pressure sensitive adhesiveness or tackiness for the drape material as to hold it firmly in place during the operation, but not be so adhesive therefor that there is danger of tearing the drape during removal thereof, whether the drape or sheet material be paper, cloth, or plastic.

Conventionally, of course, pressure sensitive adhesives are applied in a variety of ways at the factory to a variety of backing materials for later use in adhering the backing materials to another surface—e.g., surgical adhesive tape, paper-backed masking tape, pressure sensitive labels, cellophane tape, etc.—but such adhesive materials and such applications are to be distinguished from the liquid application of an adhesive composition at the point of use for adhering to otherwise nonadhesive surfaces. Conventionally, also, various liquid adhesive compositions designed for application at the point or time of use are intended to set up permanently upon evaporation of the solvent or other drying to form a permanent, nonreleasable and utlimately non-tacky adhesive bond between the two surfaces being adhered. Such a situation, also, is to be distinguished from the liquid application of an adhesive composition which, for a prolonged period, will remain usefully tacky but having a degree of tackiness or adhesiveness less than that which will form a permanent dry bond between the surfaces being adhered.

Even known pressure sensitive adhesives pre-applied to a backing material are not conventionally formulated to provide the low degree of tack here advantageous, particularly when the drape or sheet material has no greater tensile strength or resistance to delamination than paper. For example, when a variety of known and commercially available pressure sensitive and adhesive materials on a variety of backing materials were tested for the peel strength or adhesive strength according to ASTM testing method D903–49 (in which the adhesives were measured on an Instron tensile testing device which indicates the force required to peel a pressure applied smooth plastic surface one inch wide from the adhesive film being tested, at the separation rate of six inches per minute), several commercially available surgical adhesive tapes measured in the vicinity of 350–410 grams, and pressure sensitive commercial cellophane tapes registered around 310 grams. By contrast, liquid adhesive compositions embodying this invention tested at not exceeding about 250 grams and preferred compositions at about 100 grams by the same procedure.

In addition to a prolonged and limited tackiness, however, it is desired that compositions embodying this invention also have such tackiness or adhesive characteristics correlated with the film forming, cohesive or film tensile strength, and preferential adhesiveness for the surface to which the composition is first applied, particularly, after elimination of the solvent or vehicle in which original application of the liquid compositions is achieved. The provision and predetermined control or correlation of these various characteristics, however, does not necessarily inhere in the same materials which might provide the desired prolonged tackiness or limited tackiness and, in many cases, these several characteristics and properties may actually be inconsistent. Thus, for example, to one extent or another, certain film forming materials also possess certain adhesive characteristics, and certain primarily adhesive materials also possess certain film forming characteristics. If, however, a single component were utilized to provide both the controlled cohesion or film strength characteristics and the prolonged and limited tackiness desired, adjustment of the cohesion or film strength, as by plasticizing or otherwise, does not necessarily result in concomitant adjustment or control of prolonged tackiness or limited tackiness.

Accordingly, adhesive compositions embodying this invention include distinct components, which may be separately adjusted as to their several characteristics and properties, for providing the desired cohesion or strength or film forming properties and, additionally, the desired control of adhesion producer or adhesive properties. As will be understood, of course, the adhesiveness of the film forming component and whatever film forming properties the adhesion producing component may have all combine to contribute to the final result in both these areas of the ultimate composition, and the control of the independent properties of either of these components must be provided with due regard to the others.

As will be understood, also, for any given film forming or adhesion producing material, one direct and primary means for controlling the cohesion or film tensile strength or the adhesive tackiness or extent of prolongation of tackiness after solvent removal includes the utilization of a plasticizer component, either of the so-called polymeric type of plasticizer or the ester-type of plasticizer. It has been found that the amount of plasticizer may be increased in a particular composition of film forming and adhesion producing materials to provide increased prolongation of tackiness or a more limited tackiness or adhesive strength, or adjustment of the peel strength as measured by the above ASTM method. As plasticizer proportion is increased, the cohesiveness or tensile strength of the adhesive film, after solvent removal, is diminished and substantially so that a point may ultimately be reached where the cohesive film strength is so low, regardless of how low the pressure sensitive tackiness may be, that parts of the adhesive film, even after solvent removal, are disrupted or removed from the surface to which the adhesive composition is first applied when an article or sheet or other surface is removed from the adhesive film after first being brought into pressure sensitive contact therewith.

Generally, considering the types of illustrative synthetic resin film forming and adhesion producing materials noted herein, the cohesion and/or adhesive film strength are reduced below desired or satisfactory limits when there is incorporated in the adhesive composition, as for the purpose of prolonging or decreasing or otherwise adjusting the tackiness thereof, an amount of ester-type plasticizer in excess of about 200%, or an amount of polymeric-type plasticizer in excess of about 250% (by weight) of the other film forming and adhesion producing components in the composition. Thus, the particular film forming and adhesion producing components should be selected for compositions embodying this invention so that adhesion to the surface to which first applied, the desired low degree of pressure sensitive tackiness and prolonged extent of tackiness of the applied film are achieved with amounts of plasticizer less than the foregoing in order to produce a composition to form an adhesive film having sufficient adhesion to the surface to which first applied and internal cohesion or film tensile strength to withstand being removed or torn or separated from the surface to which it is applied in liquid form when another material or article or sheet is peeled away from the adhesive film after having been pressure-adhered thereto.

Additionally, as noted, it is preferred that the adhesive compositions embodying this invention be prepared and adapted for liquid application in solution or emulsion form, and, most conveniently, for spray application form, for example, "aerosol" spray-type containers. Particularly with such compositions prepared for the surgical application above noted, the constituents, including the solvent or vehicle, are chosen in addition to the desired adhesive and film forming properties, to be relatively non-irritating to normal skin and with the solvent chosen to provide the desired drying time as well as to be non-smarting and otherwise not unpleasant under the conditions of use. For example, with the specific compositions described below, the allergic reactivity level on human skin has been reported as being less than that of medically accepted commercial surgical adhesive tape, and the solvents or vehicles utilized are selected to produce, when applied to areas of normal human skin, a minimum of smarting or chilling or other medically or psychologically undesired effects. The original compositions before application are substantially stable and non-oxidizing for convenient storage, and, preferably, maintain their own sterility as by including components which discourage the existence of obnoxious bacteria.

Sprayable adhesive compositions having the attributes noted above have been produced according to this invention by the combination of a film forming component, an adhesion producing component, a plasticizer, and a bacteriostatic component, which components are admixed to form, with a suitable vehicle, a liquid solution or emulsion. Such compositions are stable to exposure to temperatures ranging from −65° F. to +165° F. in storage and are usable at temperatures ranging from 20° F. up to 130° F. When volatile organic solvents are used, the solvent evaporation time can be easily controlled, and is usually less than a half hour, after which time, as noted, the applied adhesive film still maintains its limited tackiness for periods ranging up to many hours.

Such a composition is preferably packed in metal containers or so-called "aerosol" spray-type containers accompanied by suitable well known spray propellants such as halogenated-aliphatic type or compressed gaseous type propellants. Such compositions may also be applied by brushing, flowing, wiping on, or dipping.

The film forming component may be of the class consisting of vinyl polymers (including vinyl chloride-vinylidine chloride copolymers, vinyl chloride-vinyl acetate copolymers and carboxylated or hydroxylated modifications of such copolymers, vinyl chloride-butadiene polymers, vinyl butyral polymers, vinyl acetate polymers, etc.), polyacrylic and poly-methacrylic esters and polymers, cellulose acetate butyrate, ethyl cellulose, and compatible combinations thereof. The adhesion producing component may be one or compatible combinations of such resins as polyacrylic or polymethacrylic esters and polymers, glycerol phthalate, abietic acid-glycerol and organic acid and/or phenol modifications of such abietic acid glycerol, amine-aldehyde resins, and resins containing maleic anhydride or phenols (including cresols). The plasticizer may be one or a combination of such monomeric substances as butyl phthallyl butyl glycollate, di-2(ethylhexyl) azelate, acetylated castor oil, phthalic anhydride-vegetable oil derivatives, tricresyl phosphate, o- and p-toluene sulfonamides; or polymeric substances such as chlorinated paraffin, cumarone-indene, sebacic acid polymers, treated raw oiticica and other vegetable oils (treated to produce compatibility with film formers).

The bacteriostatic agent (or, in some cases as noted below, bacteriocidal agent) may satisfactorily be maleic anhydride (as included, for example, in the adhesive component), phenols (including cresols, chlorinated phenols and thio-chlorinated phenols, etc.). That is, especially with adhesive compositions for surgical uses, it is desirable for the material to be sterile prior to use, as well as bacteriostatic. In some instances it may be convenient to include in the composition a bacteriocidal component of sufficient potency to kill contaminating bacteria which may be present in the containers for the adhesive composition and/or the processing and filling machinery therefor. Particularly in cases where the compositions embodying this invention are packaged in pressurized spray-type containers, the solvent component (such as the acetone and ethyl acetate solvents noted in Example I below) in combination with the "Freon" propellant in the sealed container may be sufficiently bacteriocidal to render the compositions as packaged sterile, and even without a special step of sterilizing the containers before or after packaging. In compositions not embodying solvents or other components which, with or without the propellant, may not be considered of sufficient bacteriocidal potency for this sterilizing effect, additional bacteriocidal materials such as chloro-phenols, etc., may be added to the composition. Also, in instances where the compositions embodying this invention are packaged in other than sealed, pressurized, spray-type containers (e.g., openable containers for brush application) and/or in other instances where the packaged compositions are repeatedly exposed to contamination of air borne bacteria or contamination by a brush or other mechanical applicator, it may be desired to include in the compositions a more potent bacteriocidal agent to provide a self-sterilizing composition which will maintain its own surgical sterility despite repeated contaminations. Satisfactory results are achieved by adding, in such a case, to any of the formulations noted herein about 0.25 part by weight of "Actamer" (a thio-chloro-phenol) and/or 0.10 part "Santophen I" (a chloro-phenol).

It will be understood, of course, that one or another of the foregoing synthetic resin components may be operatively useful as, for example, an adhesion producer, although disclosed as a film former. That is, as is well known among synthetic resin chemists, one particular type of polymer may be useful for one purpose when polymerized to a certain degree, and yet the same basic synthetic resin structure, polymerized to a different degree, may be useful for a different purpose and/or may be considered a different material within the context of the instant disclosure. Similarly, a single resin component may simultaneously perform more than one of the desired film-forming, adhesion producing, plasticizing, etc., functions in a particular formulation.

Satisfactory volatile solvents for the above include one or a combination of such solvents as organic esters (e.g., ethyl acetate), ketones (e.g., acetone), organic ethers or oxides (e.g., ethylene oxide), aromatic hydrocarbons (e.g., toluene), or chlorinated aliphatic hydrocarbons (e.g., methylene chloride). The solvent component is chosen to produce the desired drying rate and viscosity of liquid composition with regard to the method of application, ease of storage, traumatic smarting effect, etc. As noted above, such a solution may be post-emulsified by the addition of appropriate emulsifying agents, anti-foaming agents, and water.

A satisfactory method of preparation of compositions using an organic solvent includes adding the film former slowing to solvent with agitation in a suitable covered container taking care to avoid agglomeration. The remaining ingredients are added upon the complete solution of the film former and agitation is continued until all ingredients are dissolved. After suitable filtration to remove any suspended foregin matter, the liquid composition is packed into aerosol spray containers at approximately 0° F. in known manner, or otherwise packaged as desired. Similarly, a satisfactory method of preparation of water-emulsion compositions embodying this invention includes dissolving the film-forming and adhesion producing components in the least amount of volatile solvents which will form a complete solution, adding an emulsifying agent (such as commercially available non-ionic, anionic, or cationic surface active agents) and, if desired, a conventional anti-foaming agent or protective colloid with vigorous agitation until well dispersed, and then, also with agitation, adding sufficient water to produce the desired emulsion. It should also be noted that emulsifiable film-forming and adhesion producing materials appropriate for use in an emulsion-type composition embodying this invention are commercially available already formed into water emulsions.

Specific illustrative examples of compositions embodying this invention, with which satisfactory results have been achieved, are:

*Example 1*                                            Parts by weight
Vinyl chloride-vinyl acetate resin (VAGH)_____ 8
Maleic anhydride modified glycerol-abietic-acid resin
   (Amberlac D-96)_____ 3
Epoxidated-oil type plasticizer (Paraplex G-50)____ 4
Butyl phthalyl-butyl glycolate plasticizer (Santicizer
   B-16) _____ 4
Ethyl acetate_____ 36
Acetone _____ 40
Methyl isobutyl ketone_____ 5

*Example 2*

Parts by weight
Hard film type polyester resin of acrylic and methacrylic acid (Acryloid B-82, 40% solids)_____ 12
Softer film variation of same resin (Acryloid C-10-LV, 40% solids)_____ 18
Butyl benzyl phthalate plasticizer (Santicizer 160)___ 9
Methyl ethyl ketone_____ 61

Example 3

| | |
|---|---|
| Vinyl chloride copolymer with vinylidiene chloride (Geon 222) | 15 |
| Diphenyl octyl phosphate plasticizer (Santicizer 141) | 5 |
| Methyl ethyl ketone | 80 |

Example 4

| | |
|---|---|
| Soft film type N-butyl methacrylate resin polymer (Lucite 44) | 15 |
| Decyl butyl phthalate plasticizer | 8 |
| Methyl ethyl ketone | 77 |

Example 5

| | |
|---|---|
| Soft film type N-butyl methacrylate resin polymer (Lucite 44) | 15 |
| Rosin derived alkyd type resin adhesive (Neolyn 23) | 4 |
| Di-iso-octyl phthalate plasticizer (Hercoflex 200) | 4 |
| Methyl ethyl ketone | 77 |

Example 6

| | |
|---|---|
| Hard film forming cellulose ethyl ether (Dow ethyl cellulose N-10) | 10 |
| 2-biphenyl-diphenyl phosphate resin (Dow 5) | 12 |
| Isopropanol (99%) | 20 |
| Toluene | 40 |
| Butyl acetate | 18 |

Example 7

| | |
|---|---|
| Water emulsion of soft film forming type polyacrylic resin (Rhoplex FRN, 40% solids) | 45 |
| Water emulsion of medium hard film type polyacrylic resin (Rhoplex B-60A, 46% solids) | 15 |
| Water | 40 |

Example 8

| | |
|---|---|
| Water emulsion of acrylic polymer resin (Rhoplex B-15, 46% solids) | 40 |
| Water emulsion of medium hard film type polyacrylic resin (Rhoplex B-60A, 46% solids) | 10 |
| Water | 50 |

In the foregoing examples, it should be noted that all the parts given are by weight. Also, for completeness, the various components are described in terms of the manufacturer's descriptions, as well as the manufacturer's grade designations. For example, the Acryloid resins are manufactured commercially by Rohm & Haas as are the various Rhoplex and Amberlac resins and Paraplex plasticizers. The Santicizer plasticizers are the product of Monsanto Chemical Company, the Geon resins are produced by B. F. Goodrich Chemical Company, the Lucite by Du Pont, the Neolyn resins and Hercoflex plasticizers by Hercules Powder Company, and the Dow products by Dow Chemical Company.

The variations in materials and proportions in the foregoing examples are meant to illustrate how the various materials of different degrees of inherent adhesiveness and pressure sensitive tackiness and different degrees of film strength or film hardness may be admixed and combined to provide the desired characteristics of an adhesive material according to this invention. Thus, in the first example, different components are illustrated for providing the primary film forming and adhesion producing characteristics, with a blend of different plasticizers for achieving the desired end result. Also the solvents are particularly chosen for the various substances involved with, for example, the inclusion of a solvent such as acetone for its fast drying and sterilizing effect and a solvent such as methyl isobutyl ketone to control and somewhat delay complete solvent evaporation. Example 2 is particularly illustrative of the utilization of two essentially similar resins but polymerized to different degrees coordinated to produce the desired film forming cohesion characteristics and more or less independent adhesion and tackiness producing characteristics. Example 4 illustrates a formulation in which one polymer material is such as to admit of the desired control of tackiness with desired film strength merely by appropriate selection and proportions of plasticizer, while Example 5 is similar to Example 4 but of a somewhat greater degree of tack by the inclusion of an additional adhesion producing alkyd resin, and Examples 7 and 8 illustrate water emulsion type formulations, as compared to organic solvent types.

While the compositions and products herein described constitute preferred embodiments of the invention, it is to be understood that the invention is not limited to these precise compositions and products, and that changes may be made therein without departing from the scope of the invention which is defined in the appended claims.

What is claimed is:

1. A liquid adhesive composition for liquid application to skin as an adherent film thereover with limited but prolonged pressure-sensitive tackiness for a smooth vinyl plastic sheet brought into contact therewith, comprising a film forming component, an adhesion producing component, a plasticizing component, and a liquid vehicle for admixture of said components selected from the group consisting of organic solvents and water, said film forming component being selected from the group consisting of vinyl polymers and copolymers, polyacrylic esters and polymers, polymethacrylic esters and polymers, cellulose acetate butyrate, ethyl cellulose, and compatible combinations thereof, said adhesion producing component being selected from the group consisting of polyacrylic esters and polymers, polymethacrylic esters and polymers, glycerol phthalate resins, abietic acid-glycerol resins and organic acid and phenol modifications thereof, amine-aldehyde resins, maleic anhydride resins, vinyl polymers and copolymers, polyphenyl esters, phenol resins, alkyd resins, and compatible combinations thereof, said plasticizing component being selected from the group consisting of polymeric type and ester type plasticizers and being present in an amount up to 250% and 200% by weight, respectively, based on the weight of said film forming and adhesion producing components to provide after evaporation of the liquid vehicle an adherent film, the exposed surface of said film having a pressure-sensitive tackiness sufficient to adhere thereto a smooth vinyl plastic sheet and not exceeding approximately 250 grams measured as peel strength by the ASTM testing method D903-49 herein disclosed, in which one test surface is suitable material to which said adhesive composition will adhere more strongly than it does to said plastic sheet, and said tackiness of said exposed surface of said film for said plastic sheet being less than each of the cohesive strength of said film and the adhesiveness thereof to skin.

2. A liquid adhesive composition as set forth in claim 1 wherein said plasticizer is selected from the group consisting of butyl phthallyl-butyl glycolate, di-2(ethyl-hexyl) azelate, epoxy modified alkyds, acetylated castor oil, phthalic anhydride vegetable oil derivatives, tricresyl phosphate, toluene sulfonamides, butyl benzyl phthalate, diphenyl octyl phosphate, decyl butyl phthalate, dioctyl phthalate, chlorinated paraffin, cumarone-indene, sebacic acid polymers, acrylic and methacrylic acid polymers, compatible raw oiticia, and compatible combinations thereof.

3. A liquid adhesive composition as set forth in claim 1 in which said plasticizer is present in an amount between about 15% and about 45% based on the weight of said film forming and adhesion producing components.

4. A liquid adhesive composition for liquid application to skin as an adherent film thereover with limited but prolonged pressure-sensitive tackiness for a smooth vinyl plastic sheet brought into contact therewith, comprising a film forming component, an adhesion producing component, a plasticizing component, and a liquid vehicle for admixture of said components selected from the group consisting of organic solvents and water, said film forming component being selected from the group consisting of vinyl polymers and copolymers, polyacrylic esters and polymers, polymethacrylic esters and polymers, cellulose acetate butyrate, ethyl cellulose, and compatible combinations thereof, and being present in an amount between about 8 and about 15 parts by weight, said adhesion producing component being selected from the group consisting of polyacrylic esters and polymers, polymethacrylic esters and polymers, glycerol phthalate resins, abietic acid-glycerol resins and organic acid and phenol modifications thereof, amine-aldehyde resins, maleic anhydride resins, vinyl polymers and copolymers, polyphenyl esters, phenol resins, alkyd resins, and compatible combinations thereof, said plasticizing component being selected from the group consisting of polymeric type and ester type plasticizers and being present in an amount up to 250% and 200% by weight, respectively, based on the weight of said film forming and adhesion producing components to provide after evaporation of the liquid vehicle an adherent film, the exposed surface of said film having a pressure-sensitive tackiness sufficient to adhere thereto a smooth vinyl plastic sheet and not exceeding approximately 250 grams measured as peel strength by the ASTM testing method D903–49 herein disclosed, in which one test surface is suitable material to which said adhesive composition will adhere more strongly than it does to said plastic sheet, and said tackiness of said exposed surface of said film for said plastic sheet being less than each of the cohesive strength of said film and the adhesiveness thereof to skin, said parts by weight being based on a total composition weight of 100 parts.

5. A liquid adhesive composition for liquid application to skin as an adherent film thereover with limited but prolonged pressure-sensitive tackiness for a smooth vinyl plastic sheet brought into contact therewith, comprising a film forming component, an adhesion producing component, a plasticizing component, and a liquid vehicle for admixture of said components selected from the group consisting of organic solvents and water, said film forming component being selected from the group consisting of vinyl polymers and copolymers, polyacrylic esters and polymers, polymethacrylic esters and polymers, cellulose acetate butyrate, ethyl cellulose, and compatible combinations thereof, said adhesion producing component being selected from the group consisting of polyacrylic esters and polymers, polymethacrylic esters and polymers, glycerol phthalate resins, abietic acid-glycerol resins and organic acid and phenol modifications thereof, amine-aldehyde resins, maleic anhydride resins, vinyl polymers and copolymers, polyphenyl esters, phenol resins, alkyd resins and compatible combinations thereof, and being present in an amount between about 20% and about 55% of the weight of said film forming component, said plasticizing component being selected from the group consisting of polymeric type and ester type plasticizers and being present in an amount up to 250% and 200% by weight, respectively, based on the weight of said film forming and adhesion producing components to provide after evaporation of the liquid vehicle an adherent film, the exposed surface of said film having a pressure-sensitive tackiness sufficient to adhere thereto a smooth vinyl plastic sheet and not exceeding approximately 250 grams measured as peel strength by the ASTM testing method D903–49 herein disclosed, in which one test surface is suitable material to which said adhesive composition will adhere more strongly than it does to said plastic sheet, and said tackiness of said exposed surface of said film for said plastic sheet being less than each of the cohesive strength of said film and the adhesiveness thereof to skin.

6. A liquid adhesive composition for liquid application to skin as an adherent film thereover with limited but prolonged pressure-sensitive tackiness for a smooth vinyl plastic sheet brought into contact therewith, comprising a film forming component, an adhesion producing component, a plasticizing component, and a liquid vehicle for admixture of said components selected from the group consisting of organic solvents and water, said film forming component being selected from the group consisting of vinyl polymers and copolymers, polyacrylic esters and polymers, polymethacrylic esters and polymers, cellulose acetate butyrate, ethyl cellulose, and compatible combinations thereof, and present in an amount between about 8 and about 15 parts by weight, said adhesion producing component being selected from the group consisting of polyacrylic esters and polymers, polymethacrylic esters and polymers, glycerol phthalate resins, abietic acid-glycerol resins and organic acid and phenol modifications thereof, amine-aldehyde resins, maleic anhydride resins, vinyl polymers and copolymers, polyphenyl esters, phenol resins, alkyd resins, and compatible combinations thereof, said plasticizing component being selected from the group consisting of polymeric type and ester type plasticizers and being present in an amount between about 15% and about 45% based on the weight of said film forming and adhesion producing components to provide after evaporation of the liquid vehicle an adherent film, the exposed surface of said film having a pressure-sensitive tackiness sufficient to adhere thereto a smooth vinyl plastic sheet and not exceeding approximately 250 grams measured as peel strength by the ASTM testing method D903–49 herein disclosed, in which one test surface is suitable material to which said adhesive composition will adhere more strongly than it does to said plastic sheet, and said tackiness of said exposed surface of said film for said plastic sheet being less than each of the cohesive strength of said film and the adhesiveness thereof to skin, said parts by weight being based on a total composition weight of 100 parts.

7. A liquid adhesive composition for liquid application to skin as an adherent film thereover with limited but prolonged pressure-sensitive tackiness for a smooth vinyl plastic sheet brought into contact therewith, comprising a film forming component, an adhesion producing component, a plasticizing component, and a liquid vehicle for admixture of said components selected from the group consisting of organic solvents and water, said film forming component being selected from the group consisting of vinyl polymers and copolymers, polyacrylic esters and polymers, polymethacrylic esters and polymers, cellulose acetate butyrate, ethyl cellulose, and compatible combinations thereof, and present in an amount between about 8 and about 15 parts by weight, said adhesion producing component being selected from the group consisting of polyacrylic esters and polymers, polymethacrylic esters and polymers, glycerol phthalate resins, abietic acid-glycerol resins and organic acid and phenol modifications thereof, amine-aldehyde resins, maleic anhydride resins, vinyl polymers and copolymers, polyphenyl esters, phenol resins, alkyd resins, and compatible combinations thereof, and being present in an amount between 20% and about 55% of the weight of said film forming component, said plasticizing component being selected from the group consisting of polymeric type and ester type plasticizers and being present in an amount between 15% and about 45% based on the weight of said film forming and adhesion producing components to provide after evaporation of the liquid vehicle an adherent film, the exposed surface of said film having a pressure-sensitive tackiness sufficient to adhere thereto a smooth vinyl plastic sheet and not exceeding approximately 250 grams measured as peel strength by the ASTM testing method D903–49 herein disclosed, in which one test surface is suitable material to which said adhesive composition will adhere more strongly than it does to said plastic sheet, and said tackiness of said exposed surface of said film for said plastic sheet being less than each of the cohesive strength of said film and the adhesiveness thereof to skin, said parts by weight being based on a total composition weight of 100 parts.

8. A liquid adhesive composition for liquid application to skin as an adherent film thereover with limited but prolonged pressure-sensitive tackiness for a smooth vinyl plastic sheet brought into contact therewith, comprising a film forming component, an adhesion producing component, a plasticizing component, and a liquid vehicle for admixture of said components selected from the group consisting of organic solvents and water and present in an amount between about 60 and about 85 parts by weight, said film forming component being selected from the group consisting of vinyl polymers and copolymers, polyacrylic esters and polymers, polymethacrylic esters and polymers, cellulose acetate butyrate, ethyl cellulose, and compatible combinations thereof and present in an amount between about 8 and about 15 parts by weight, said adhesion producing component being selected from the group consisting of polyacrylic esters and polymers, polymethacrylic esters and polymers, glycerol phthalate resins, abietic acid-glycerol resins and organic acid and phenol modifications thereof, amine-aldehyde resins, maleic anhydride resins, vinyl polymers and copolymers, polyphenyl esters, phenol resins, alkyd resins, and compatible combinations thereof, and being present in an amount between about 4 and about 9 parts by weight, said plasticizing component being selected from the group consistnig of polymeric type and ester type plasticizers and being present in an amount between about 4 and about 9 parts by weight to provide after evaporation of the liquid vehicle an adherent film, the exposed surface of said film having a pressure-sensitive tackiness sufficient to adhere thereto a smooth vinyl plastic sheet and not exceeding approximately 250 grams measured as peel strength by the ASTM testing method D903-49 herein disclosed, in which one test surface is suitable material to which said adhesive composition will adhere more strongly than it does to said plastic sheet, and said tackiness of said exposed surface of said film for said plastic sheet being less than each of the cohesive strength of said film and the adhesiveness thereof to skin, said parts by weight being based on a total composition weight of 100 parts.

9. A liquid adhesive composition for liquid application to skin as an adherent film thereover with limited but prolonged pressure-sensitive tackiness for a smooth vinyl plastic sheet brought into contact therewith, comprising a film forming component, an adhesion producing component, a plasticizing component, and a liquid vehicle for admixture of said components selected from the group consisting of organic solvents and water, said film forming component being selected from the group consisting of vinyl polymers and copolymers, polyacrylic esters and polymers, polymethacrylic esters and polymers, cellulose acetate butyrate, ethyl cellulose, and compatible combinations thereof, and being present in an amount from between about 45% and about 80% of the weight of said film forming component and said adhesion producing component as calculated on a dry basis after evaporation of said liquid vehicle, said adhesion producing component being selected from the group consisting of polyacrylic esters and polymers, polymethacrylic esters and polymers, glycerol phthalate resins, abietic acid-glycerol resins and organic acid and phenol modifications thereof, amine-aldehyde resins, maleic anhydride resins, vinyl polymers and copolymers, polyphenyl esters, phenol resins, alkyd resins, and compatible combinations thereof, and being present in an amount from between about 20% and about 55% of the weight of said film forming component and said adhesion producing component as calculated on a dry basis after evaporation of said liquid vehicle, said plasticizing component being selected from the group consisting of polymeric type and ester type plasticizers and being present in an amount up to 250% and 200% by weight, respectively, based on the weight of said film forming and adhesion producing components to provide after evaporation of the liquid vehicle an adherent film, the exposed surface of said film having a pressure-sensitive tackiness sufficient to adhere thereto a smooth vinyl plastic sheet and not exceeding approximately 250 grams measured as peel strength by the ASTM testing method D903-49 herein disclosed, in which one test surface is suitable material to which said adhesive composition will adhere more strongly than it does to said plastic sheet, and said tackiness of said exposed surface of said film for said plastic sheet being less than each of the cohesive strength of said film and the adhesiveness thereof to skin.

10. A liquid adhesive composition for liquid application to skin as an adherent film thereover with limited but prolonged pressure-sensitive tackiness for a smooth vinyl plastic sheet brought into contact therewith, comprising a film forming component, an adhesion producing component, a plasticizing component, and a liquid vehicle for admixture of said components selected from the group consisting of organic solvents and water and being present in an amount between about 60 and about 85 parts by weight, said film forming component being selected from the group consisting of vinyl polymers and copolymers, polyacrylic esters and polymers, polymethacrylic esters and polymers, cellulose acetate butyrate, ethyl cellulose, and compatible combinations thereof, and being present in an amount from between about 45% and about 80% of the weight of said film forming component and said adhesion producing component as calculated on a dry basis after evaporation of said liquid vehicle, said adhesion producing component being selected from the group consisting of polyacrylic esters and polymers, polymethacrylic esters and polymers, glycerol phthalate resins, abietic acid-glycerol resins and organic acid and phenol modifications thereof, amine-aldehyde resins, maleic anhydride resins, vinyl polymers and copolymers, polyphenyl esters, phenol resins, alkyd resins, and compatible combinations thereof, being present in an amount from between about 20% and about 55% of the weight of said film forming component and said adhesion producing component as calculated on a dry basis after evaporation of said liquid vehicle, said plasticizing component being selected from the group consisting of polymeric type and ester type plasticizers and being present in an amount between about 15% and about 45% based on the weight of said film forming and adhesion producing components to provide after evaporation of the liquid vehicle an adherent film, the exposed surface of said film having a pressure-sensitive tackiness sufficient to adhere thereto a smooth vinyl plastic sheet and not exceeding approximately 250 grams measured as peel strength by the ASTM testing method D903-49 herein disclosed, in which one test surface is suitable material to which said adhesive composition will adhere more strongly than it does to said plastic sheet, and said tackiness of said exposed surface of said film for said plastic sheet being less than each of the cohesive strength of said film and the adhesiveness thereof to skin, said parts by weight being based on a total composition weight of 100 parts.

11. A liquid adhesive composition as set forth in claim 10 which also includes a bacteriostatic agent for maintaining the sterility of said composition.

12. A liquid adhesive composition as set forth in claim 10 adapted for spray application to form said adhesive film on skin and including a volatile propellant for generating said spray.

13. A liquid adhesive composition for application to skin to form thereover a continuous adhesive film having preferential adhesiveness for said skin with limited but prolonged pressure-sensitive tackiness for a smooth plastic surface brought into contact therewith, comprising 10 to 12 parts by weight of a mixture of vinyl chloride-vinyl acetate resin and maleic anhydride modified glycerol abietic-resin, between 4 and 9 parts by weight of a mixture of an epoxy modified alkyd plasticizer and butyl phthalate-butyl glycolate plasticizer, and between 70 to 80 parts by weight of a volatile organic solvent for providing after evaporation of said liquid vehicle an adherent film, the exposed surface of said film having a pressure-sensitive tackiness sufficient to adhere thereto a smooth vinyl plastic sheet and not exceeding approximately 250 grams measured as peel strength by the ASTM testing method D903–49 herein disclosed in which one test surface is a smooth plastic sheet of the vinyl type and the other surface is a suitable material to which said adhesive composition will adhere more strongly than to said vinyl test surface, and said tackiness of said exposed surface of said film for said plastic sheet being less than each of the cohesive strength of said film and the adhesiveness thereof to skin, said parts by weight being based on a total composition weight of 100 parts.

References Cited in the file of this patent

UNITED STATES PATENTS

| | | |
|---|---|---|
| 1,895,367 | Bernhard | Jan. 24, 1933 |
| 2,481,895 | Ziegler | Sept. 13, 1949 |
| 2,648,614 | Martin et al. | Aug. 11, 1953 |
| 2,684,915 | Tinsley | July 27, 1954 |
| 2,866,771 | Sellers | Dec. 30, 1958 |
| 2,875,169 | Reid et al. | Feb. 24, 1959 |
| 2,907,722 | Staicopolous | Oct. 6, 1959 |

FOREIGN PATENTS

| | | |
|---|---|---|
| 575,678 | Great Britain | Feb. 28, 1946 |

OTHER REFERENCES

Delmonte: "The Technology of Adhesives" (1947), pages 449–451.